US009530440B1

United States Patent
Ahmad et al.

(10) Patent No.: US 9,530,440 B1
(45) Date of Patent: Dec. 27, 2016

(54) COMPENSATING FOR LOSS OF CURRENT THROUGH SHORTED TUNNELING MAGNETORESISTANCE SENSORS

(71) Applicant: International Business Machines Corporation, Armonk, NY (US)

(72) Inventors: Said A. Ahmad, Tucson, AZ (US); Wlodzimierz S. Czarnecki, Palo Alto, CA (US); Ernest S. Gale, Tucson, AZ (US); Icko E. T. Iben, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/927,906

(22) Filed: Oct. 30, 2015

(51) Int. Cl.
  *G11B 5/39* (2006.01)
  *G11B 20/18* (2006.01)
(52) U.S. Cl.
  CPC .............. *G11B 5/39* (2013.01); *G11B 20/1816* (2013.01)
(58) Field of Classification Search
  None
  See application file for complete search history.

(56) References Cited

U.S. PATENT DOCUMENTS

| | | | |
|---|---|---|---|
| 6,903,889 B2 | 6/2005 | Li et al. | |
| 6,960,480 B1 | 11/2005 | Horng et al. | |
| 7,804,657 B1 | 9/2010 | Hogg et al. | |
| 7,872,824 B1 * | 1/2011 | Macchioni | G11B 5/02 360/66 |
| 8,044,816 B2 | 10/2011 | Axtman et al. | |
| 8,331,064 B2 * | 12/2012 | Iben | B82Y 25/00 360/324.2 |
| 8,902,531 B2 | 12/2014 | Bui et al. | |

OTHER PUBLICATIONS

Oliver et al., "Dielectric breakdown in magnetic tunnel junctions having an ultrathin barrier", Journal of Applied Physics, vol. 91, No. 7, Apr. 1, 2002, © 2002 American Institute of Physics, pp. 4348-4352.
U.S. Appl. No. 14/974,385, filed Dec. 18, 2015, Entitled "Compensating for Loss of Current Through Shorted Tunneling Magnetoresistance Sensors".

(Continued)

*Primary Examiner* — K. Wong
(74) *Attorney, Agent, or Firm* — Alexa L. Ashworth

(57) ABSTRACT

Embodiments of the present invention provide methods, systems, and computer program products for compensating for loss of current through shorted tunneling magnetoresistance (TMR) sensors. In one embodiment, for a magnetic head having multiple TMR read sensors, a first voltage limit is set for most parts and a second voltage limit is set for all of the parts. A number of TMR read sensors which are allowed to function between the first and the second voltage limits is determined using a probability algorithm, which determines the probability that the application of the second voltage limit will result in a dielectric breakdown within an expected lifetime of a drive is below a threshold value. For the number of TMR read sensors which are allowed to function at voltages between the first and second voltage limits, a determined subset of those sensors are then allowed to function at the second voltage limit.

20 Claims, 9 Drawing Sheets

(56) References Cited

OTHER PUBLICATIONS

List of IBM Patents or Patent Applications Treated as Related, dated Dec. 18, 2015, 2 pages.
Ahmad et al., U.S. Appl. No. 15/180,230, filed Jun. 13, 2016, Entitled "Compensating for Loss of Current Through Shorted Tunneling Magnetoresistance Sensors".
List of IBM Patents or Patent Applications Treated as Related, Dated Jun. 14, 2016, 2 pages.

* cited by examiner

US 9,530,440 B1

COMPENSATING FOR LOSS OF CURRENT THROUGH SHORTED TUNNELING MAGNETORESISTANCE SENSORS

BACKGROUND OF THE INVENTION

The present invention relates generally to the field of data storage systems, and more particularly to compensating for the loss of current through shorted tunneling magnetoresistance (TMR) sensors.

TMR sensors can be used to read magnetic data from a magnetic tape media. The thickness of the tunnel junction (TJ) is very small, of the order of 1 nm. Electrical shorts across these thin TJs can result in current bypassing the bulk area of the TJ and going through the short. Shorts can occur from various sources, such as dielectric breakdown or by scratches which occur during manufacturing (lapping) or in a tape drive by asperities on the tape which can cause scratches.

TJs can be damaged by dielectric breakdown, and the mean dielectric breakdown time for a group of self-similar TMRs subjected to a voltage stress decreases with increasing voltage. The process of running tape across a TMR sensor can also result in a short across the TJ. In this case, often the short diverts current away from the active portion of the TMR, and at a fixed current, results in a drop in amplitude.

SUMMARY

Embodiments of the present invention provide methods, systems, and computer program products for compensating for loss of current through shorted tunneling magnetoresistance (TMR) sensors. In one embodiment, one or more computer processors, for a magnetic head having multiple TMR read sensors, set a first voltage limit for a plurality of parts and a second voltage limit for all of the parts. One or more computer processors determine a number of TMR read sensors which are allowed to function between the first and the second voltage limits using a probability algorithm, wherein the probability that application of the second voltage limit will result in a dielectric breakdown within an expected lifetime of a drive is below a threshold value. One or more computer processors, in response to determining a number of TMR read sensors which are allowed to function at voltages between the first and second voltage limits, determine a number of TMR read sensors which are allowed to function at the second voltage limit.

DETAILED DESCRIPTION

Embodiments of the present invention provide reliable systems and methods for compensating for the loss of current through a defective magnetic recording TMR sensor due to electrical shorting across the TMR. In one embodiment, a bias current is chosen for a magnetic head with multiple read sensors, in order to statistically avoid dielectric breakdown, by setting an upper limit voltage for the majority of read elements. If there is one or more read elements which functions poorly, the drive selects another bias current which is above the upper limit voltage, but below a higher second voltage limit. Furthermore, embodiments of the present invention can be used to respond to TMR read elements which have undergone shorting events, by setting the bias current and either sequestering a section of the tape where the short has occurred or slowing the velocity of the tape when the head passes over a section of the tape where the short has occurred, enabling the defective sensor to achieve the reliability standards necessary for operation.

Figure 1:
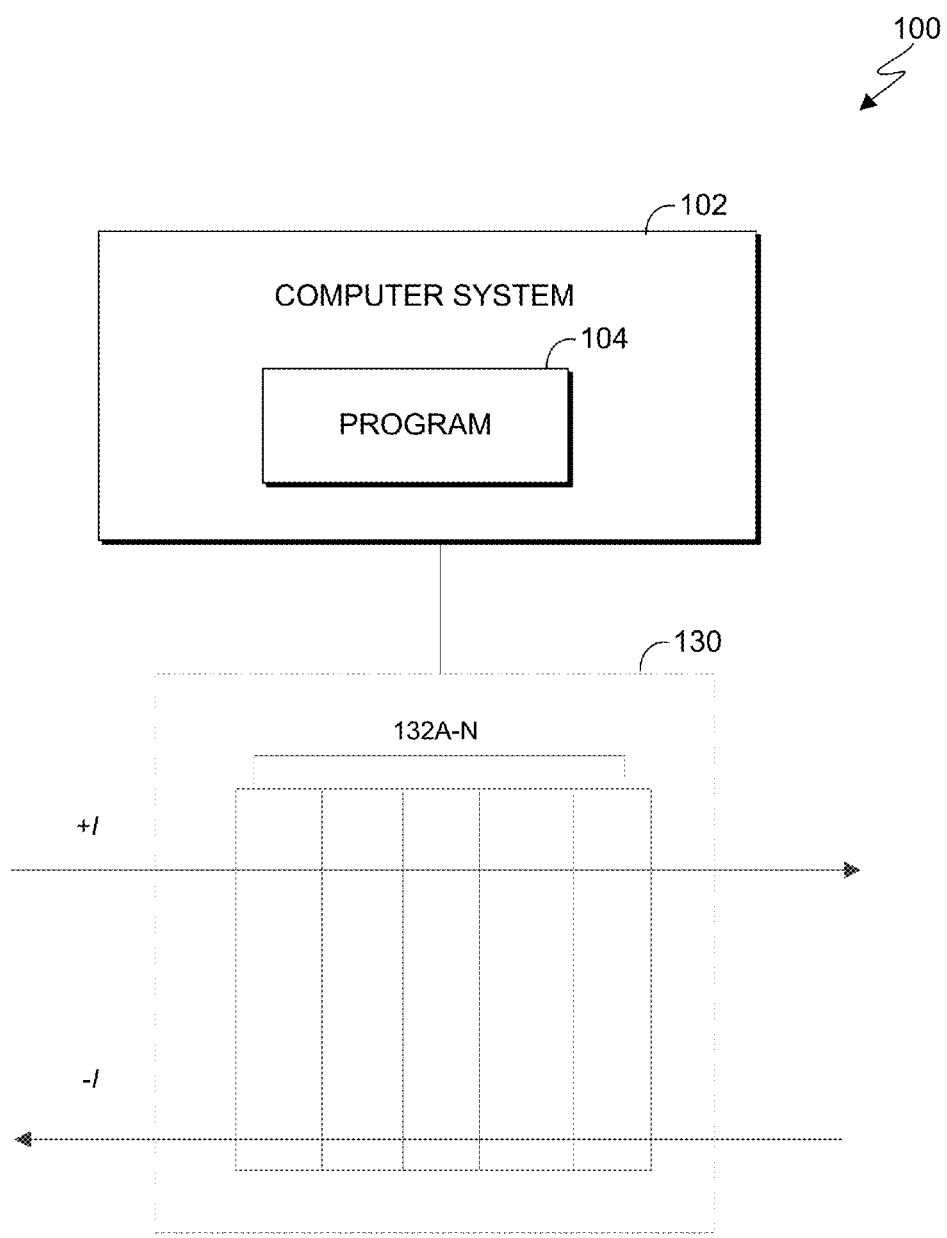
FIG. 1 depicts a block diagram illustrating an environment, in accordance with an embodiment of the present invention.

FIG. 1 is a functional block diagram of an environment 100 in accordance with an embodiment of the present invention. Environment 100 includes computer system 102. Computer system 102 can be a desktop computer, laptop computer, specialized computer server, or any other computer system known in the art. In certain embodiments, computer system 102 represents a computer system utilizing clustered computers and components to act as a single pool of seamless resources when accessed through a network. In general, computer system 102 is representative of any electronic device, or combination of electronic devices, capable of executing machine-readable program instructions, as described in greater detail with regard to FIG. 7.

Computer system 102 includes program 104. Program 104 performs various testing operations on TMR sensor 106 (and other TMR sensors), to which computer system 102 is operatively coupled (e.g., via one or more wired connections) to detect whether TMR sensor 106 is damaged and to perform the calculations to enable the damaged sensor to compensate for the loss of current necessary for operation.

TMR sensor 106 comprises one or more layers 132A-N, including at least one of: a first contact, a magnetic shield, a first lead, pinning layers (which can include antiferromagnet, a first and second pinning layer separated by a spacer so the pinning layers are antiferromagnetically coupled to one another), a tunnel barrier, a free layer, a second lead, a second magnetic shield and a second contact (not depicted in FIG. 1). As shown in FIG. 1, computer system 102, in conjunction with program 104, can pass positive (+I) and negative (−I) polarity bias currents through TMR sensor 106 perpendicular to the plane of the sheet layers and tunnel the tunnel barrier film from the first contact to the second contact and vice versa. References to a current I, as used herein, refers to a magnitude of that current, unless otherwise noted. As will be understood by those of ordinary skill in the art, FIG. 1 provides a simplified illustration of TMR sensor 106 and is not to be construed as limiting embodiments of the present invention to that which is depicted. For example, the direction of positive or negative currents could be reversed depending on the desires of the designer of TMR sensor 106 and/or a device in which TMR sensor 106 is incorporated. Furthermore, a designer may add more layers or remove layers from TMR sensor 106 depending on usage. TMR sensor 106 can be implemented with any TMR sensor technology known in the art. Similarly, program 104 and computer system 102 can be operatively coupled to a plurality of TMR sensors 106. For example, a head or other device may comprise many TMR sensors 106.

Figure 2:
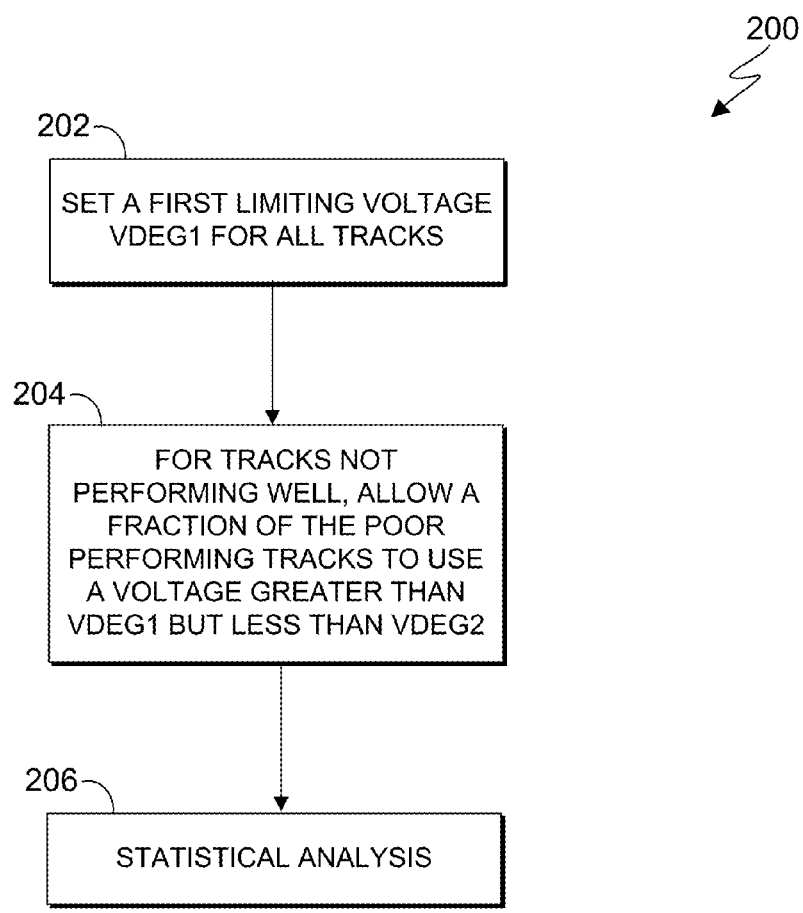
FIG. 2 is a flowchart illustrating operations for compensating for a shorted TMR sensor, in accordance with an embodiment of the present invention.

FIG. 2 is a flowchart 200 illustrating operations for compensating for a shorted TMR sensor, in accordance with an embodiment of the present invention. For the purposes of this application, the terms "TMR sensor" and "track" will be used interchangeably.

Program 104 sets a first voltage limit for all tracks (operation 202). In this embodiment, program 104 sets the limiting voltage for all of the tracks at a first voltage limit, $V_{DEG1}$, at which the number of low voltage breakdown tracks which may suffer dielectric breakdown over the lifetime of the product is acceptably low.

A reliability risk to TMR sensors is dielectric breakdown across the thin tunneling barrier as a result of an electrical (voltage) overstress or EOS. To avoid dielectric breakdown, the voltage applied to a TMR must be sufficiently low so that the probability of dielectric breakdown is low during the life of the product using the TMR. The mean dielectric breakdown time for a group of self-similar TMRs subjected to a voltage stress decreases with increasing voltage. The dielectric breakdown time for TMR sensors is not a single time point for a TMR of a given thickness and area, but rather breakdown times for a given voltage are a broad distribution in time. Further, there are two distinct mean breakdown times, $t_{short}$ and $t_{long}$, where both $t_{short}/t_{long}$ can be several orders of magnitude. The parts which fit in the distribution of parts with $t_{short}$ and $t_{long}$ for the same voltage can also be distinguished by distribution of voltages for a fixed time such that $t_{short}$ is associated with a low voltage ($V_{low}$) and $t_{long}$ is associated with a high voltage ($V_{high}$). For example, for each distribution, the survival probability, for the $j^{th}$ distribution, $S_j(t)$, out to a time (t) can be expressed as the following formulas:

$$Sj(t)=\exp(-(t/\tau j)^{\beta j}) \qquad \text{Formula 1}$$

The total survival probability, S(t), is then given by:

$$S(t)=\Sigma_j f_j S_j(t) \qquad \text{Formula 2}$$

where $f_j$ is the average fraction of parts of type j breakdown phenomenon such that, $$\Sigma_j f_j=1. \qquad \text{Formula 3}$$

One functional form used to fit the voltage dependence of the breakdown time follows an exponential dependence, with the exponent being linear with voltage:

$$\tau_j(V_{mr})=\tau_{oj}*\exp(V_{mr}/V_{jo}) \qquad \text{Formula 4}$$

Another functional form used to fit the voltage dependence of the breakdown time follows an exponential dependence with the exponent being linear with the inverse of the voltage:

$$\tau_j(V_{mr})=\tau_{oj}*\exp(V_{oinvj}/V_{mr}), \qquad \text{Formula 5}$$

where j can be a single distribution (j=1) or can be the high and low distribution (i.e., j=1 or 2). The higher the value of $V_{mr}$, the shorter the time, t, for the dielectric breakdown. The smaller the value of $\beta_j$ the wider the distribution of breakdown times. The time $\tau_{oj}$ can be calculated as:

$$\tau_{Sj}=\tau_j*[-\ln(S_j)]^{1/\beta j} \qquad \text{Formula 6}$$

The failure fraction, $F_j$, is given by: $F_j \equiv 1-S_j$. For $F_j \ll 1$, $$\tau_{Sj}=\tau_j*F_j^{1/\beta j} \qquad \text{Formula 7}$$

For $\beta_j=1$ and 0.5, the time for $F_j=1\%$ is $0.01\tau_j$ and $0.0001\tau_j$, respectively, and where for $t=\tau_j$, $F=63\%$. Thus for $\beta_j=1$ and 0.5, the time for 1% failures is 100 times and 10,000 times shorter than for 63% failures.

TMR sensors are known to have two distributions of breakdown times with a high and low voltage breakdown phenomenon. The ratio of the failure voltage at a fixed time for the high and low voltage failure phenomenon can be around a factor of 2. Thus, even though the failure times for the high voltage failure mode at a chosen voltage $V_{DEG2}$ may not result in failures during the lifetime ($t_{life}$) of the product ($\tau_{S1} \ll t_{life}$), the low voltage phenomenon may have a measurable failure rate when using $V_{DEG2}$, for example:

$$\text{Fail}_2(V_{DEG2})=f_2*\exp(-(t_{life}/\tau_j(V_{DEG2}))^{\beta j})) \qquad \text{Formula 8}$$

may be too high a value, while:

$$\text{Fail}_2(V_{DEG1})=f_2*\exp(-(t_{life}/\tau_j(V_{DEG1})^{\beta j}) \qquad \text{Formula 9}$$

with $V_{DEG1}<V_{DEG2}$ may be sufficiently low to not be of a concern.

Program 104 determines whether the tracks are performing at an acceptable rate, and, for the tracks which are not performing well, for voltages with an upper limit of $V_{DEG1}$, program 104 allows a fraction of the tracks to use a voltage greater than the first voltage ($V_{DEG1}$), but below a second higher voltage, $V_{DEG2}$ (operation 204). The trade-off is between immediately scrapping the drive in the manufacturing line because of the poor performing tracks, or to allow the poor performing tracks to function at a voltage above $V_{DEG1}$ and below $V_{DEG2}$, and risk potential dielectric breakdown during the lifetime of the drive. The issue is to statistically determine the risk of future failure by enabling the poor performing tracks to operate at voltages between $V_{DEG1}$ and $V_{DEG2}$.

Program 104 performs statistical analysis to determine that the probabilistic number of drive failures is reasonable (operation 206). The operations for the statistical analysis are discussed in greater detail with respect to FIGS. 4 and 5.

Figure 3:
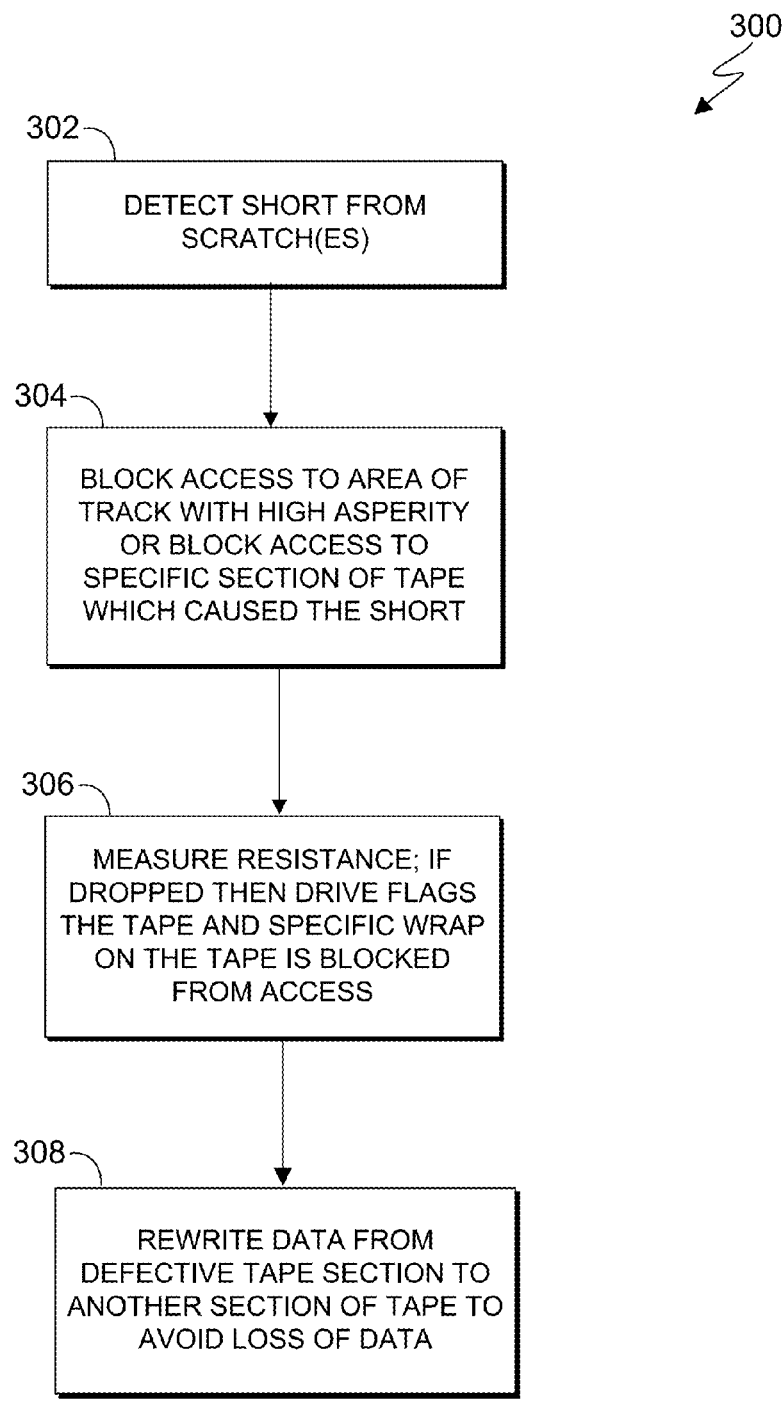
FIG. 3 is a flowchart illustrating operations for compensating for a shorted TMR sensor, in accordance with another embodiment of the present invention.

FIG. 3 is a flowchart 300 illustrating operations for compensating for a shorted TMR sensor, in accordance with another embodiment of the present invention.

The process of running tape across a TMR sensor can result in a short across the tunnel junction (TJ). The short will divert current away from the active portion of the TMR, and at a fixed current, will result in a drop in amplitude. The original amplitude, $Amp_o$, is the TMR read-back amplitude when a voltage of $V_{TMRo}$ is applied across the TJ, such that:

$$V_{TMRo} = I_{biaso} * R_{TMRo} \quad \text{Formula 10}$$

where $R_{TMRo}$ is the initial resistance of the non-shorted TMR and (a cable resistance and internal leads subtracted off) $I_{biaso}$, is the initial current applied to achieve the voltage of $V_{TMRo}$. The cable resistance may be calculated as an average of values from a group of cables measured directly, using either the average of each track, or an average of all of the tracks. The cable resistance can be loaded into a drive code as a specific value which is measured directly, or can be measured indirectly by measuring a TMR resistance using a probe tester, prior to bonding a cable to the TMR read sensors, then subtracting the TMR resistance from the total resistance. When the short occurs with a shorting resistance, $R_{short}$, which is in parallel with the TMR resistance, $R_{TMRo}$, the measured resistance, $R_{read}$, will be:

$$R_{read} = R_{short} * R_{TMRo} / (R_{short} + R_{TMRo}) \quad \text{Formula 11}$$

It is also possible that a scratching particle, or multiple scratching particles could create more than one shorting scratch, lowering the value of $R_{short}$, and thus, $R_{read}$. For the purposes of this discussion, $R_{short}$ represents the current value of the short. For a current, $I_{bias}$, the voltage across the TMR will be:

$$V_{TMR} = I_{bias} * R_{read} = V_{TMRo} * (1 / (1 + (R_{TMRo}/R_{short}))) < V_{TMRo}. \quad \text{Formula 12}$$

As a result of the current being diverted through the short, the amplitude of the TMR will be reduced.

If a new, higher, bias current, $I_{biasnew}$, is applied which is sufficient to bring the voltage back up to $V_{TMRo}$, then some or most of the amplitude can be recovered. To bring the current through the TMR back to the value prior to the short, a new bias current, $I_{biasnew}$, is given by:

$$I_{biasnew} = I_{bias} * (1 + (R_{TMRo}/R_{short})) \quad \text{Formula 13}$$

and $$V_{TMR} = I_{biasnew} * R_{read} = V_{TMRo} \quad \text{Formula 14}$$

Program 104 detects a short from particulates (operation 302).

Program 104 blocks access to the area of the track with an asperity which is sufficiently hard and of sufficient size to cause a short across the tunnel junction of the TMR read sensor (operation 304). Because the shorts are deleterious to the functioning of a read sensor, once a short has been detected, a procedure sensing a formation of one or more shorts may request removal of a cartridge from circulation, thereby blocking access to the area of tape with the suspected high asperity. In some embodiments, a procedure for detecting a single short should be implemented and the drive should then block access to the specific section of tape which caused the short.

In some embodiments, program 104 may have the drive speed decreased over the section of tape where an asperity is detected to have caused a short. The energy imparted to the head from an asperity is proportional to the square of the velocity of the tape. Thus, dropping the speed by a factor of, for example, 2, 4, or 8, will drop the energy by a factor of 4, 16, and 64, respectively. With a lower energy impact, shorting may be avoided.

Program 104 measures the resistance, and if the resistance has dropped, then the drive flags the tape and specific wrap on the tape (operation 306). For example, when a drive reaches the end of a wrap, the resistance of all the tracks can be measured and compared to the previous wrap. If the resistance has dropped by a specified amount, then the drive will flag that tape and the specific wrap, or section of a wrap, on the tape and block access to that section of tape, or slow down the tape speed over that section to avoid further shorting.

Program 104 rewrites the data from the defective tape section to another section of the tape (operation 308). Any data written on that section of tape is then rewritten to avoid the loss of data. Information detailing any blocked sections of a tape should be recorded in some portion of the tape for future reading.

Figure 4:
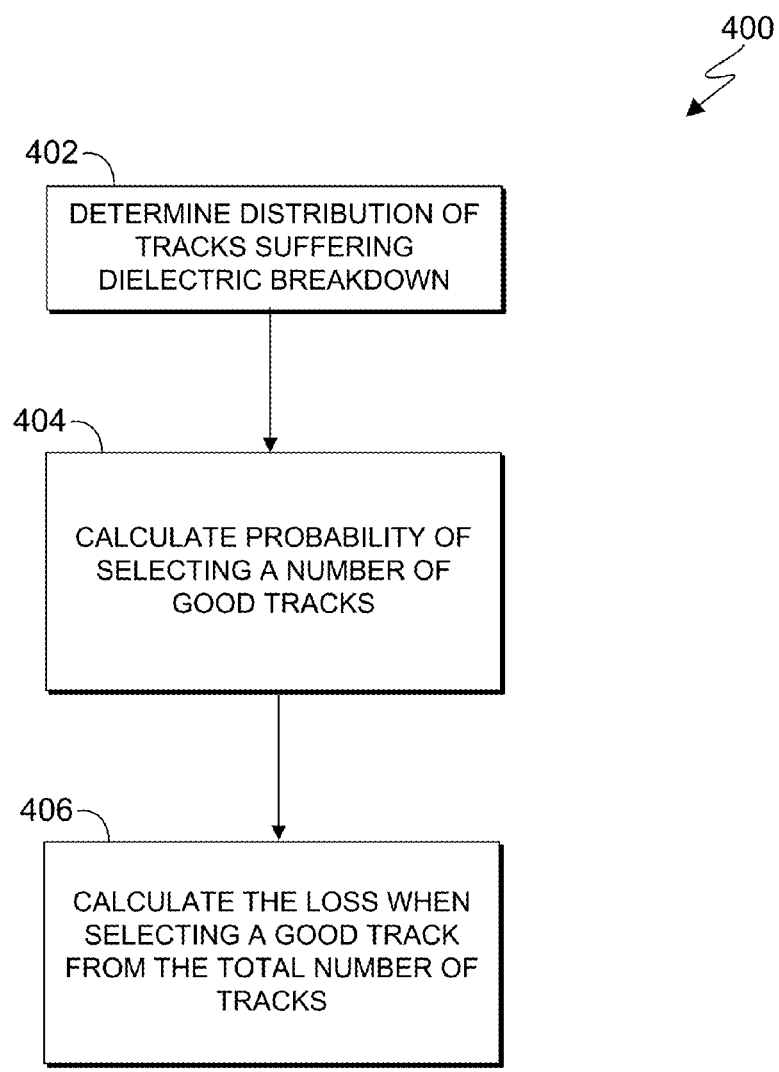
FIG. 4 is a flowchart illustrating operations for determining the probability of a TMR sensor defect, in accordance with an embodiment of the present invention.

FIG. 4 is a flowchart illustrating operations for determining the probability of a TMR sensor defect, in accordance with an embodiment of the present invention. The probability of a given track suffering dielectric breakdown, as used herein, is defined as B, and the probability that the track survives is defined as G, so that:

$$G = 1 - B \quad \text{Formula 15}$$

Program 104 determines a distribution of m tracks out of N total tracks which have a defect, such that they will suffer dielectric breakdown (operation 402), ($P_B$ (N, B, m)), using the following:

$$[G+B]^N = \Sigma_{m=0:N} P_B(N,B,m) \quad \text{Formula 16}$$

with $a_m = N! / [(N-m)! * m!]$, and $$P_B(N, B, m) = \quad \text{Formula 17}$$

$$a_m * G^{N-m} * B^m = a_m * G^N * \left(\frac{B}{G}\right)^m = [N! / [(N-m)! * m!]] *$$

$$[1-B]^N * [B/1[1-B]]^m$$

and the average number of bad tracks, $<m>$, is given by:

and the average number of bad tracks, $<m>$, is given by:

$$<m> = \Sigma_{m=0:N} m * P_B(N,B,m) = B, \quad \text{Formula 18}$$

and, as required, $<m>$ is equal to B.

Figure 6A:
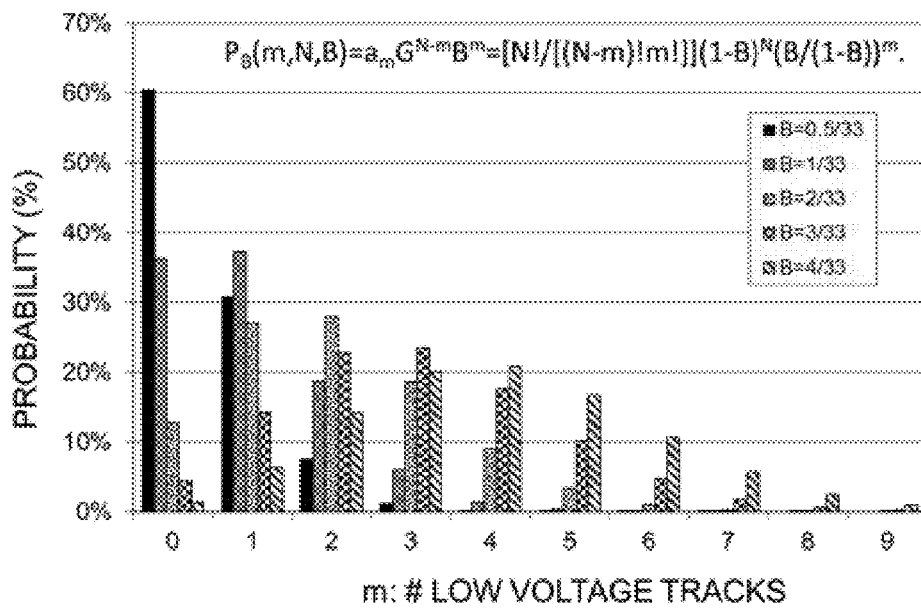
FIG. 6A is an example plot of the probability distribution versus the number of low voltage tracks for various average numbers of low voltage tracks, in accordance with an embodiment of the present invention.

A plot of $P_B$ (N, B, m) versus m using formula 17 is depicted in FIG. 6A, for N=33 and N*B=0.5, 1, 2, 3, and 4.

Program 104 calculates the probability of selecting only good tracks when randomly selecting $N_S$ tracks out of a possible N tracks, when the number of defective tracks is m (operation 404). The number of options for selecting no defective tracks, $N_{ODef}$(N, m, $N_S$), when selecting $N_S$ tracks, with m defective tracks out of a total of N tracks is calculated as:

$$N_{ODef}(N,m,N_S) = (N-m)! / (N-N_S-m)! \quad \text{Formula 19}$$

Where the total number of possible combinations of selecting tracks is calculated as:

$$N_{combo}(m,N) = N! / (N-N_S)! \quad \text{Formula 20}$$

Thus, the probability of selecting zero (0) bad tracks, $P_{ODef}$(N, m, $N_S$) with $N_S$ selections for a head having m bad tracks out of N total tracks is calculated as:

$$P_{ODef}(N,m,N_S) = N_{ODef}(N,m,N_S) / N_{combo}(N,m) = [(N-m)!$$
$$(N-N_S)!] / [N!(N-N_S-m)!] \quad \text{Formula 21}$$

Figure 6B:
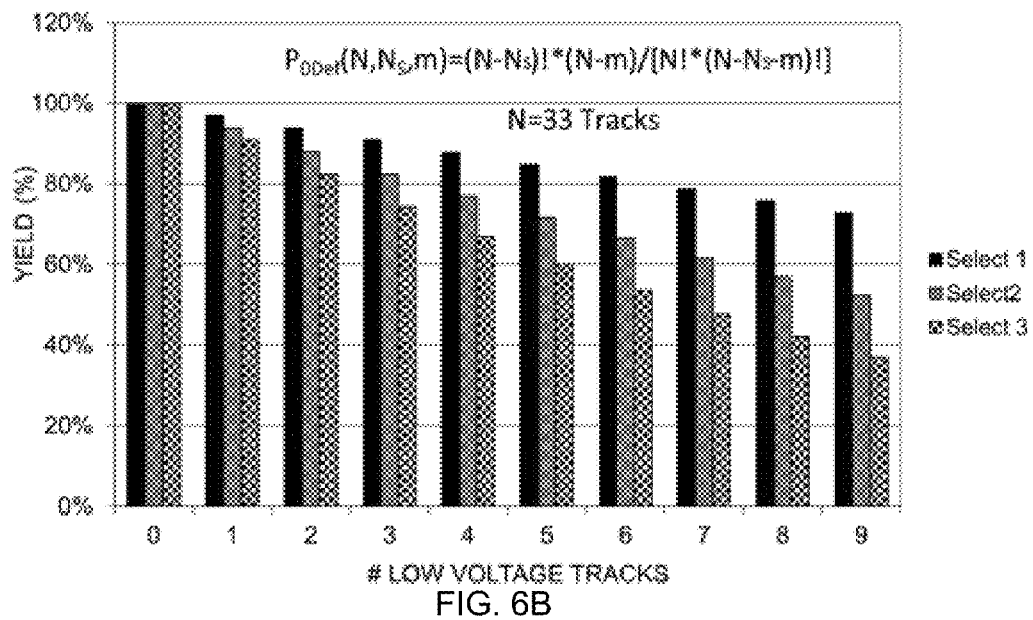
FIG. 6B is an example plot of the probability of not selecting a defective track (yield) versus the actual number of bad tracks, when selecting 1, 2, or 3 tracks, in accordance with an embodiment of the present invention.

A plot using formulas 19-21 is depicted in FIG. 6B for $N_S$=1, 2, or 3 for N=33.

Formula 21 gives the probability of selecting zero defects where the number of defects is known to be m. For real parts, the actual value of m is not known, only the distribution is known by testing a group of similar parts and fitting them to a functional form, such as given by Formula 17, with a value of B. Program 104 calculates the loss when selecting $N_S$ out of N tracks with a probability B of a given track being bad (operation 406). The loss (Loss (N, B, $N_S$)) can be calculated as:

$$Loss(N,B,N_S)=\Sigma_{m=0:N}[1-P_{0Def}(N,m,N_S)]*P_B(N,B,m). \quad \text{Formula 22}$$

Figure 6C:
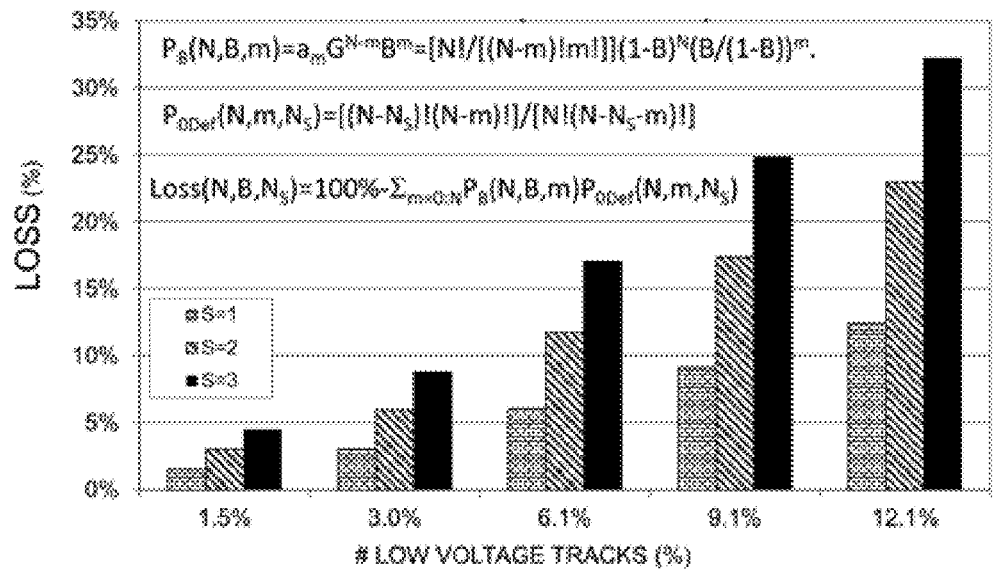
FIG. 6C is an example plot of the probability of selecting a defective track (loss) versus the average number of defective tracks, when selecting 1, 2, or 3 tracks, in accordance with an embodiment of the present invention.

This formula is solved by inserting $P_B(N, B, m)$ and $P_{0Def}(N, m, N_S)$ from formulas 17 and 21, respectively, into formula 22. A plot using formula 22 is depicted in FIG. 6C for selecting $N_S=1, 2,$ or 3 tracks out of N=33 tracks for values of N*B between 1.5% and 12.1%. Note that for m and $N_S<<N$, Formula 21 reduced to:

$$P_{0Def}(N,m,N_S)\sim 1-m*N_S/N. \quad \text{Formula 23}$$

Then Formula 22 reduces to:

$$Loss(N, B, N_S) \sim \sum_{m=0:N} [m*N_S/N] * P(N, B, m) = \left[\frac{N_S}{N}\right] * \left[\sum_{m=0:N} m*P_B(N, B, m)\right] = N_S\left[\frac{B}{N}\right]. \quad \text{Formula 24}$$

Thus, on average, the Loss is linear in the probability of a defective track (B/N) times the number of tracks sampled ($N_S$).

For example, if the drive has $N_S$ poor performing tracks (not necessarily defective, low voltage type TMRs) when operating at voltages below a voltage limit of $V_{DEG1}$ and they will operate between $V_{DEG1}$ and $V_{DEG2}$, then it may be statistically and financially advantageous to allow the three poor performing tracks to operate between $V_{DEG1}$ and $V_{DEG2}$. While a non-defective track will survive for the life of the drive for voltages up to $V_{DEG2}$, a defective track will likely fail at some time during the life of the tape drive for voltages between $V_{DEG1}$ and $V_{DEG2}$. Formula 24 shows that the probability of selecting a defective track (Loss) is given by $N_S*B/N$. The decision is then a trade-off between a 100% loss by not allowing the poor performing tracks to operate above $V_{DEG1}$ versus the probabilistic loss of $N_S*B/N$. For example, if B/N=1% and $N_S$=3, the trade-off is a potential 3% loss in the field for this particular type of drive, versus a 100% scrap rate. Furthermore, including the knowledge that the number of drives which may require the higher voltage range will be small $N_{poor}$, for example 5%, then the total loss for not enabling the higher voltage usage for the poor performing tracks would be $N_{poor}$ of 5%, while the potential loss for enabling the elevated bias voltage for the poor performers would be $N_S*B/N*N_{poor}$ or 0.15% for the above example.

Figure 5:
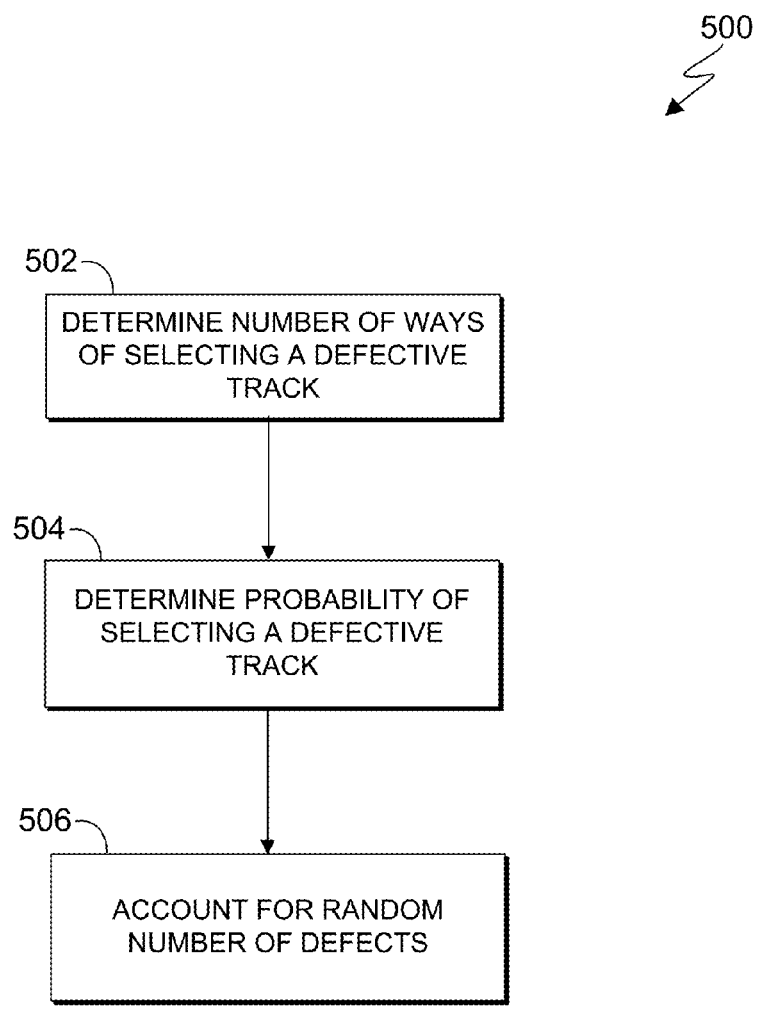
FIG. 5 is a flowchart illustrating operations for determining the probability of selecting a low voltage track out of a total number of tracks, in accordance with an embodiment of the present invention.

FIG. 5 is a flowchart illustrating operations for determining the probability of selecting a low voltage track out of a total number of tracks, in accordance with an embodiment of the present invention.

Because of the sophisticated error correction codes used in modern tape drives, a tape drive can often operate with one (1) or more poor performing tracks. In this embodiment, the probability of selecting no more than one (1) low voltage (i.e., defective) track, when randomly selecting $N_S$ out of N total tracks are selected to apply the high voltage and $N_B$ tracks are defective, is calculated. Program 104 determines the probability of selecting at most one (1) defective track when randomly selecting $N_S$ out of N total tracks with $N_B$ tracks being defective, $P_{1Def}(N, N_B, N_S)$, (operation 502), using the calculation:

$$P_{1Def}(N, N_B, N_S) = \sum_{q=1}^{N_S} P_{1Def-q}(N, N_B, N_S) \quad \text{Formula 25}$$

Where $P_{1Def-q}(N, N_B, N_S)$ is the probability that a defective track is selected on the $q^{th}$ selection and no defective track is selected for selections 1 to q−1 or for q+1 to $N_S$. $P_{1Def-q}(N, N_B, N_S)$ is calculated by directly translating the above verbiage into a mathematical expression:

$$P_{1Def-q}(N,N_B,N_S)=P_{0Def}(N,N_B,q-1)*[N_B/[N-[q-1]]]*P_{0Def}(N-q,N_B-1,N_S-q) \quad \text{Formula 26}$$

Note that the order of the variables inside the functions in Formula 26 must be maintained, to be compatible with $P_{0Def}(N, N_B=m, N_S)$ as defined in Formula 21.

Program 104 determines the probability of selecting at most one (1) defective track, $P_{1DefMax}(N,N_B,N_S)$, (operation 504), using formulas 21, 25, and 26, which is calculated as:

$$P_{1DefMax}(N,N_B,N_S)=P_{0Def}(N,N_B,N_S)+P_{1Def}(N,N_B,N_S) \quad \text{Formula 27}$$

The probability of selecting more than 1 defective track, $(P_{GT1Def})(N,N_B,N_S))$ is then:

$$P_{GT1Def}(N,N_B,N_S)=1-P_{1DefMax}(N,N_B,N_S) \quad \text{Formula 28}$$

Program 506 then accounts for a random number of defects (operation 506).

FIG. 6A is an example plot of the probability distribution versus the number of low voltage tracks for various average numbers of low voltage tracks, in accordance with an embodiment of the present invention. In this example, a histogram is plotted for the distribution of the number of tracks suffering dielectric breakdown ($P_B(N, B,m)$), where the total number of tracks, N, is 33, and the total number of tracks times the probability that a given track suffers a dielectric breakdown, B, is 0.5, 1, 2, 3, and 4. As shown, the probability of having m number of tracks suffering from dielectric breakdown is highest when the average (B) is equal to m (as described in Formula 17).

FIG. 6B is an example plot of the probability of not selecting a defective track (yield) versus the actual number of bad tracks, when selecting 1, 2, or 3 tracks, in accordance with an embodiment of the present invention. In this example, a histogram is plotted for the probability of not selecting a low voltage track versus the number of low voltage tracks (i.e., prone to dielectric breakdown) when selecting 1, 2, or 3 tracks out of a total of 33 tracks (N). The probability of not selecting a low voltage track decreases as the number of low voltage tracks (m) increases and the number of track selections (S) increases.

FIG. 6C is an example plot of the probability of selecting a defective track (loss) versus the average number of defective tracks, when selecting 1, 2, or 3 tracks, in accordance with an embodiment of the present invention. In this example, a histogram is plotted for the probability of selecting a low voltage, dielectric breakdown track when selecting 1, 2, or 3 tracks out of 33 total tracks (N) versus the average number of defective tracks. As shown, as the average number of low voltage tracks and the number of tracks selected increases, the probability of selecting a low voltage track also increases.

Figure 6D:
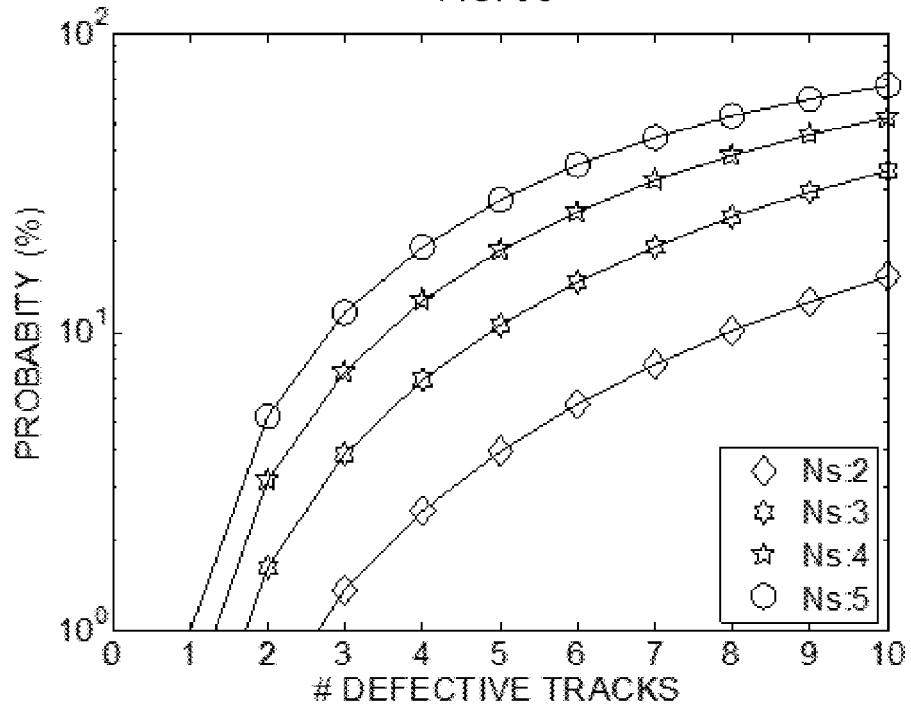
FIG. 6D is an example plot of the probability of selecting more than 1 defective track, versus the actual number of defective tracks, out of a total of N=33 tracks, when randomly selecting 2, 3, 4, or 5 tracks, in accordance with an embodiment of the present invention.

FIG. 6D plots the probability of selecting more than 1 defective track versus the actual number of defective tracks out of a total of N=33 tracks, when randomly selecting $N_S$=2, 3, 4, or 5 tracks. For an average number of defective tracks of B out of N, the probability that more than 1 defective track is selected when randomly selecting NS tracks is then the convolution of Formulas 17 and 28, using $N_B$=m:

$$P_{GT1DefAll}(N, B, N_S) = \sum_{m=0}^{N} P_B(N, B, m) * P_{GT1Def}(N, N_S, m) \quad \text{Formula 29}$$

Figure 6E:
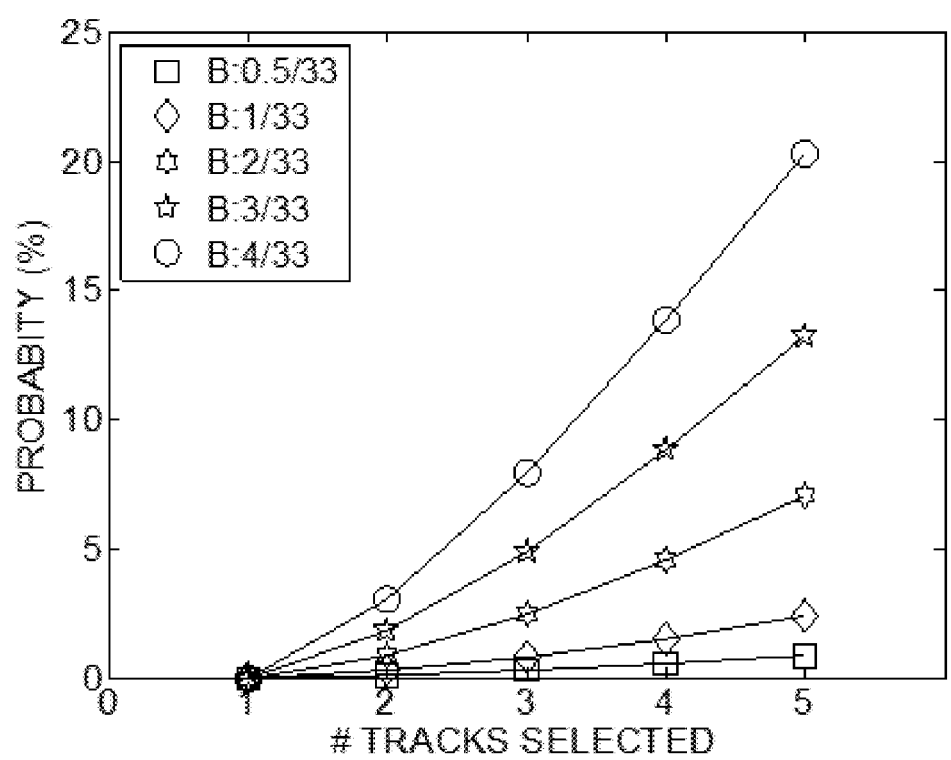
FIG. 6E is an example plot of the probability of selecting more than 1 defective track out of a total of N=33 tracks, versus the number of randomly selected tracks (Ns), when the average number of defective tracks (B) is 0.5, 1, 2, 3, and 4, out of total of N=33 tracks, in accordance with an embodiment of the present invention.

FIG. 6E plots the probability of selecting more than 1 defective track out of a total of N33 tracks versus the number of randomly selected tracks ($N_S$) when the average number of defective tracks (B) is 0.5, 1, 2, 3 and 4 out of N total. Even when selecting 5 tracks, the probability of selecting more than 1 defective track is relatively low: 0.9%, 2.4%, 7.1%, 13.3% and 20.3% respectively. The quality and/or reliability engineer would then need to decide whether the possible risk of future failure is acceptable when compared to scrapping the drive if the higher bias voltage were not used.

Figure 7:
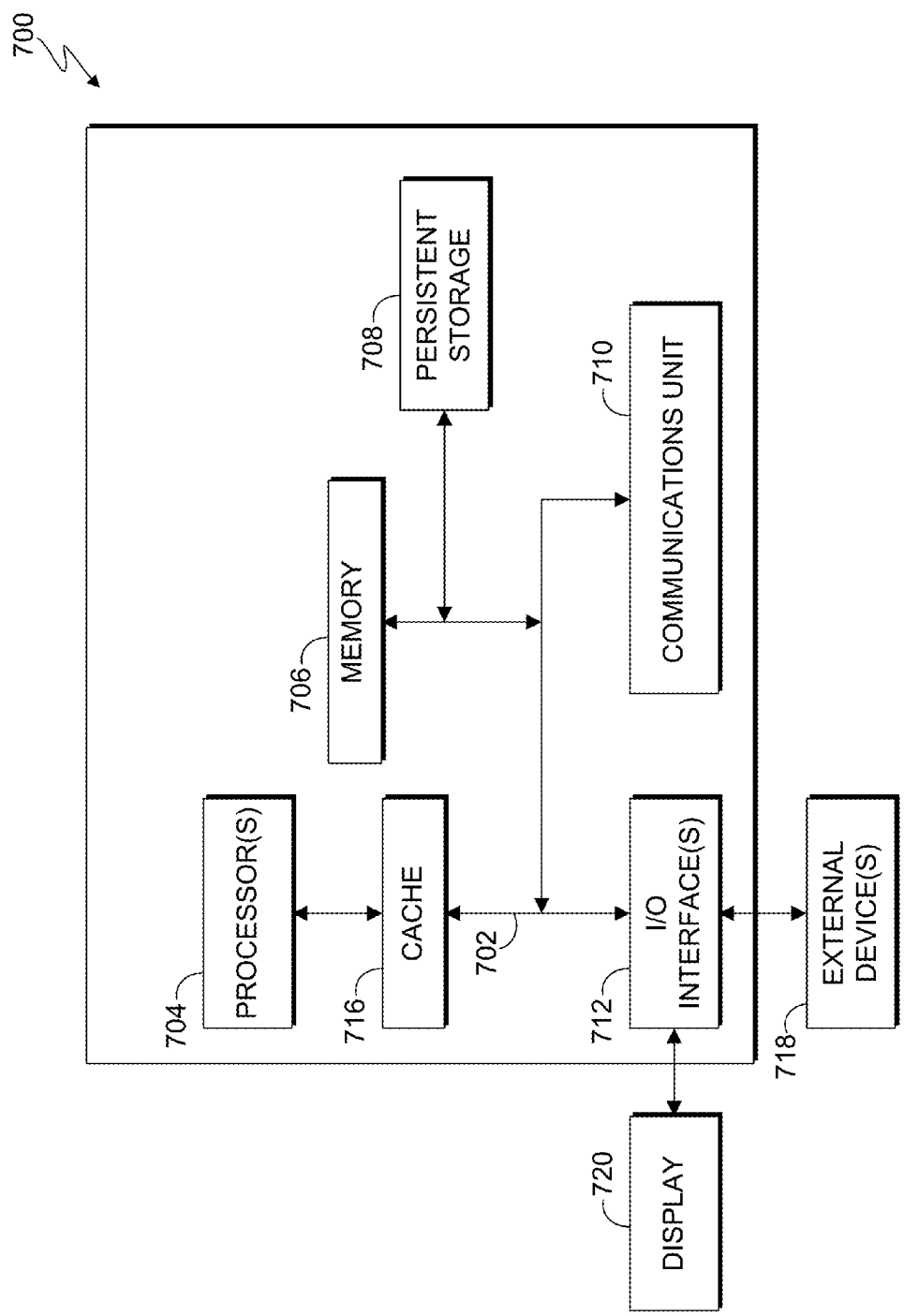
FIG. 7 is a block diagram of internal and external components of the computer system of FIG. 1, in accordance with an embodiment of the present invention.

FIG. 7 is a block diagram of internal and external components of a computer system, generally designated 700, which is representative of the computing devices of FIG. 1, in accordance with an embodiment of the present invention. It should be appreciated that FIG. 7 provides only an illustration of one implementation and does not imply any limitations with regard to the environments in which different embodiments may be implemented. Many modifications to the depicted environment may be made. In general, the components illustrated in FIG. 7 are representative of any electronic device capable of executing machine-readable program instructions. Examples of computer systems, environments, and/or configurations that may be represented by the components illustrated in FIG. 7 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 700 includes communications fabric 708, which provides communications between computer processor(s) 702, memory 704, cache 706, persistent storage 710, communications unit 714, and input/output (I/O) interface(s) 712. Communications fabric 708 can be implemented with any architecture designed for passing data and/or control information between processors (such as microprocessors, communications and network processors, etc.), system memory, peripheral devices, and any other hardware components within a system. For example, communications fabric 708 can be implemented with one or more buses.

Memory 704 and persistent storage 710 are computer-readable storage media. In this embodiment, memory 704 includes random access memory (RAM). In general, memory 704 can include any suitable volatile or non-volatile computer readable storage media. Cache 706 is a fast memory that enhances the performance of processors 702 by holding recently accessed data, and data near recently accessed data, from memory 704.

Program instructions and data used to practice embodiments of the present invention may be stored in persistent storage 710 and in memory 704 for execution by one or more of the respective processors 702 via cache 706. In an embodiment, persistent storage 710 includes a magnetic hard disk drive. Alternatively, or in addition to a magnetic hard disk drive, persistent storage 710 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 710 may also be removable. For example, a removable hard drive may be used for persistent storage 710. Other examples include optical and magnetic disks, thumb drives, and smart cards that are inserted into a drive for transfer onto another computer readable storage medium that is also part of persistent storage 710.

Communications unit 714, in these examples, provides for communications with other data processing systems or devices, including resources of network 110. In these examples, communications unit 714 includes one or more network interface cards. Communications unit 714 may provide communications through the use of either or both physical and wireless communications links. Program instructions and data used to practice embodiments of the present invention may be downloaded to persistent storage 710 through communications unit 714.

I/O interface(s) 712 allows for input and output of data with other devices that may be connected to computer system 700. For example, I/O interface 712 may provide a connection to external devices 716 such as a keyboard, keypad, a touch screen, and/or some other suitable input device. External devices 716 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 710 via I/O interface(s) 712. I/O interface(s) 712 also connect to a display 718.

Display 718 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
for a magnetic head having multiple TMR read sensors, setting, by one or more computer processors, a first voltage limit for a plurality of parts and a second voltage limit for all of the parts;
determining, by one or more computer processors, a number of TMR read sensors which are allowed to function between the first and the second voltage limits using a probability algorithm, wherein the probability that application of the second voltage limit will result in a dielectric breakdown within an expected lifetime of a drive is below a threshold value; and
responsive to determining a number of TMR read sensors which are allowed to function at voltages between the first and second voltage limits, determining a number of TMR read sensors which are allowed to function at the second voltage limit, wherein the probability that a TMR read sensor is defective and allowed to function between the first and the second voltage limits comprises:
- determining, by one or more computer processors, a distribution of a number of TMR read sensors which have a defect, from a total number of TMR read sensors;
- calculating, by one or more computer processors, a probability of selecting only a non-defective TMR read sensor, when randomly selecting a number of TMR read sensors from the total number of TMR read sensors; and
- calculating, by one or more computer processors, a probability of selecting a defective TMR read sensor when selecting a number of TMR read sensors from the total number of TMR read sensors.

2. The method of claim 1, further comprising:
detecting, by one or more processors, a problem associated with a track;
responsive to detecting a problem associated with a track, measuring, by one or more computer processors, a resistance of the track;
determining, by one or more computer processors, whether the resistance of the track has dropped below an initial value by at least a predetermined value; and
responsive to determining the resistance of the track is below an initial value and the voltage limit was not set to the second voltage limit, setting, by one or more computer processors, the voltage limit of the track to the second voltage limit.

3. The method of claim 1, further comprising:
measuring, by one or more computer processors, a total resistance of a cabled TMR sensor in the drive; and
subtracting, by one or more processors, a cable resistance value stored in the drive, to obtain a TMR sensor resistance value.

4. The method of claim 3, wherein the cable resistance is configured to be loaded into a drive code as an average of values from a group of cables measured directly using one of: an average of each track and an average of all tracks.

5. The method of claim 3, wherein the cable resistance is configured to do at least one of the following: be loaded into a drive code as a specific value of an actual cable used which was measured directly prior to being bonded to the TMR read sensors, and be measured indirectly by first measuring a TMR resistance directly using a probe tester prior to bonding a cable to the TMR read sensors and then subtracting the TMR resistance from the total resistance.

6. The method of claim 2, further comprising:
detecting, by one or more processors, a problem associated with a track;
responsive to detecting a problem associated with a track, measuring, by one or more computer processors, a resistance of the track;
determining, by one or more computer processors, whether the resistance of the track has dropped below an initial value by at least a predetermined value; and
responsive to determining the resistance of the track is below an initial value and the voltage limit was set to the second voltage limit, setting, by one or more computer processors, the voltage limit of the track to a third voltage limit, wherein the third voltage limit is less than the second voltage limit.

7. The method of claim 2, further comprising:
detecting, by one or more processors, a problem associated with a track;
responsive to detecting a problem associated with a track, measuring, by one or more computer processors, a resistance of the track;
determining, by one or more computer processors, whether the resistance of the track has dropped below an initial value by at least a predetermined value; and
responsive to determining the resistance of the track is below an initial value and the voltage limit was set to the second voltage limit, setting, by one or more computer processors, the voltage limit of the track to a third voltage limit, wherein the third voltage limit is less than the first voltage limit.

8. The method of claim 1, wherein the probability algorithm is configured to determine the probability that one or more defective tracks are selected when a number of tracks are selected and limits the number of tracks selected for the second voltage limit based on a statistical algorithm of selecting one or more defective tracks, wherein the probability that more than one defective tracks are selected when a number of tracks are selected is:

$$P_{GT1Def}(N,N_B,N_S)=1-P_{1DefMax}(N,N_B,N_S),$$

where N is a total number of tracks, $N_S$ is the number of tracks selected, and $N_B$ is a number of defective tracks.

9. The method of claim 1, further comprising:
responsive to detecting an electrical short for a particular track or a section of a particular track, recording, by one or more processors, a resistance drop value, a tape, and section of the tape for which the short occurred, in at least one of: a drive storage memory, a section of the tape which caused the short, an external computer, and a data storage medium.

10. The method of claim 9, further comprising:
responsive to detecting a short such that a sign of a change in resistance is negative and a magnitude of the change in resistance is greater than a clip threshold value, requesting, by the drive, at least one of: a removal of a shorted tape cartridge from circulation; a block of access to the section of the shorted tape causing the short; and rewriting data written from the section of the tape which caused the short to another section of the tape.

11. The method of claim 1, further comprising:
responsive to detecting an electrical short for a particular track or section of a particular track, recording, by one or more processors, a resistance drop value, a tape, and a section of the tape for which the short occurred, decreasing a tape velocity when a recording head passes over the section of the tape where the short is detected.

12. A computer program product comprising:
one or more computer readable storage media and program instructions stored on the one or more computer readable storage media, the program instructions comprising:
program instructions to, for a magnetic head having multiple TMR read sensors, set a first voltage limit for a plurality of parts and a second voltage limit for all of the parts;
program instructions to determine a number of TMR read sensors which are allowed to function between the first and the second voltage limits using a probability algorithm, wherein the probability that application of the second voltage limit will result in a dielectric breakdown within an expected lifetime of a drive is below a threshold value; and program instructions to, responsive to determining a number of TMR read sensors which are allowed to function at voltages between the first and second voltage limits, determine a number of TMR read sensors which are allowed to function at the second voltage limit, wherein the probability that a TMR read sensor is defective and allowed to function between the first and the second voltage limits comprises:
  program instructions to determine a distribution of a number of TMR read sensors which have a defect, from a total number of TMR read sensors;
  program instructions to calculate a probability of selecting only a non-defective TMR read sensor, when randomly selecting a number of TMR read sensors from the total number of TMR read sensors; and
  program instructions to calculate a probability of selecting a defective TMR read sensor when selecting a number of TMR read sensors from the total number of TMR read sensors.

13. The computer program product of claim 12, further comprising:
  program instructions to detect a problem associated with a track;
  program instructions to, responsive to detecting a problem associated with a track, measure a resistance of the track;
  program instruction to determine whether the resistance of the track has dropped below an initial value by at least a predetermined value; and
  program instructions to, responsive to determining the resistance of the track is below an initial value and the voltage limit was not set to the second voltage limit, set the voltage limit of the track to the second voltage limit.

14. The computer program product of claim 13, further comprising:
  program instructions to detect a problem associated with a track;
  program instructions to, responsive to detecting a problem associated with a track, measure a resistance of the track;
  program instructions to determine whether the resistance of the track has dropped below an initial value by at least a predetermined value; and
  program instructions to, responsive to determining the resistance of the track is below an initial value and the voltage limit was set to the second voltage limit, set the voltage limit of the track to a third voltage limit, wherein the third voltage limit is less than the second voltage limit.

15. The computer program product of claim 13, further comprising:
  program instructions to detect a problem associated with a track;
  program instructions to, responsive to detecting a problem associated with a track, measure a resistance of the track;
  program instructions to determine whether the resistance of the track has dropped below an initial value by at least a predetermined value; and
  program instructions to, responsive to determining the resistance of the track is below an initial value and the voltage limit was set to the second voltage limit, set the voltage limit of the track to a third voltage limit, wherein the third voltage limit is less than the first voltage limit.

16. A computer system comprising:
one or more computer processors;
one or more computer readable storage media;
program instructions stored on the computer readable storage media for execution by at least one of the one or more processors, the program instructions comprising:
  program instructions to, for a magnetic head having multiple TMR read sensors, set a first voltage limit for a plurality of parts and a second voltage limit for all of the parts;
  program instructions to determine a number of TMR read sensors which are allowed to function between the first and the second voltage limits using a probability algorithm, wherein the probability that application of the second voltage limit will result in a dielectric breakdown within an expected lifetime of a drive is below a threshold value; and
  program instructions to, responsive to determining a number of TMR read sensors which are allowed to function at voltages between the first and second voltage limits, determine a number of TMR read sensors which are allowed to function at the second voltage limit, wherein the probability that a TMR read sensor is defective and allowed to function between the first and the second voltage limits comprises:
    program instructions to determine a distribution of a number of TMR read sensors which have a defect, from a total number of TMR read sensors;
    program instructions to calculate a probability of selecting only a non-defective TMR read sensor, when randomly selecting a number of TMR read sensors from the total number of TMR read sensors; and
    program instructions to calculate a probability of selecting a defective TMR read sensor when selecting a number of TMR read sensors from the total number of TMR read sensors.

17. The computer system of claim 16, further comprising:
program instructions to detect a problem associated with a track;
program instructions to, responsive to detecting a problem associated with a track, measure a resistance of the track;
program instruction to determine whether the resistance of the track has dropped below an initial value by at least a predetermined value; and
program instructions to, responsive to determining the resistance of the track is below an initial value and the voltage limit was not set to the second voltage limit, set the voltage limit of the track to the second voltage limit.

18. The computer system of claim 17, further comprising:
program instructions to detect a problem associated with a track;
program instructions to, responsive to detecting a problem associated with a track, measure a resistance of the track;
program instructions to determine whether the resistance of the track has dropped below an initial value by at least a predetermined value; and
program instructions to, responsive to determining the resistance of the track is below an initial value and the voltage limit was set to the second voltage limit, set the voltage limit of the track to a third voltage limit, wherein the third voltage limit is less than the second voltage limit.

19. The computer system of claim 17, further comprising:
program instructions to detect a problem associated with a track;
program instructions to, responsive to detecting a problem associated with a track, measure a resistance of the track;
program instructions to determine whether the resistance of the track has dropped below an initial value by at least a predetermined value; and
program instructions to, responsive to determining the resistance of the track is below an initial value and the voltage limit was set to the second voltage limit, set the voltage limit of the track to a third voltage limit, wherein the third voltage limit is less than the first voltage limit.

20. The computer system of claim 16, further comprising:
program instructions to, responsive to detecting an electrical short for a particular track, record a resistance drop value, a tape, and data band for which the short occurred, in at least one of: a drive storage memory, a section of the shorted tape, an external computer, and a data storage medium.

* * * * *